June 8, 1965 J. P. MAHONY 3,188,569

RECEIVER INPUT UNIT-SYNCHRONIZING CIRCUIT

Filed Dec. 14, 1962 2 Sheets-Sheet 1

INVENTOR
J. P. MAHONY
BY Howard R. Popper
ATTORNEY

RECEIVER INPUT UNIT-SYNCHRONIZING CIRCUIT

Filed Dec. 14, 1962 2 Sheets-Sheet 2

INVENTOR
J. P. MAHONY
BY Howard R Popper
ATTORNEY

United States Patent Office 3,188,569

Patented June 8, 1965

3,188,569
RECEIVER INPUT UNIT-SYNCHRONIZING CIRCUIT

John P. Mahony, Weehawken, N.J., assignor to Bell Telephone Laboratories, Incorporated, New York, N.Y., a corporation of New York Filed Dec. 14, 1962, Ser. No. 246,858
12 Claims. (Cl. 325—321)

Figure 1:
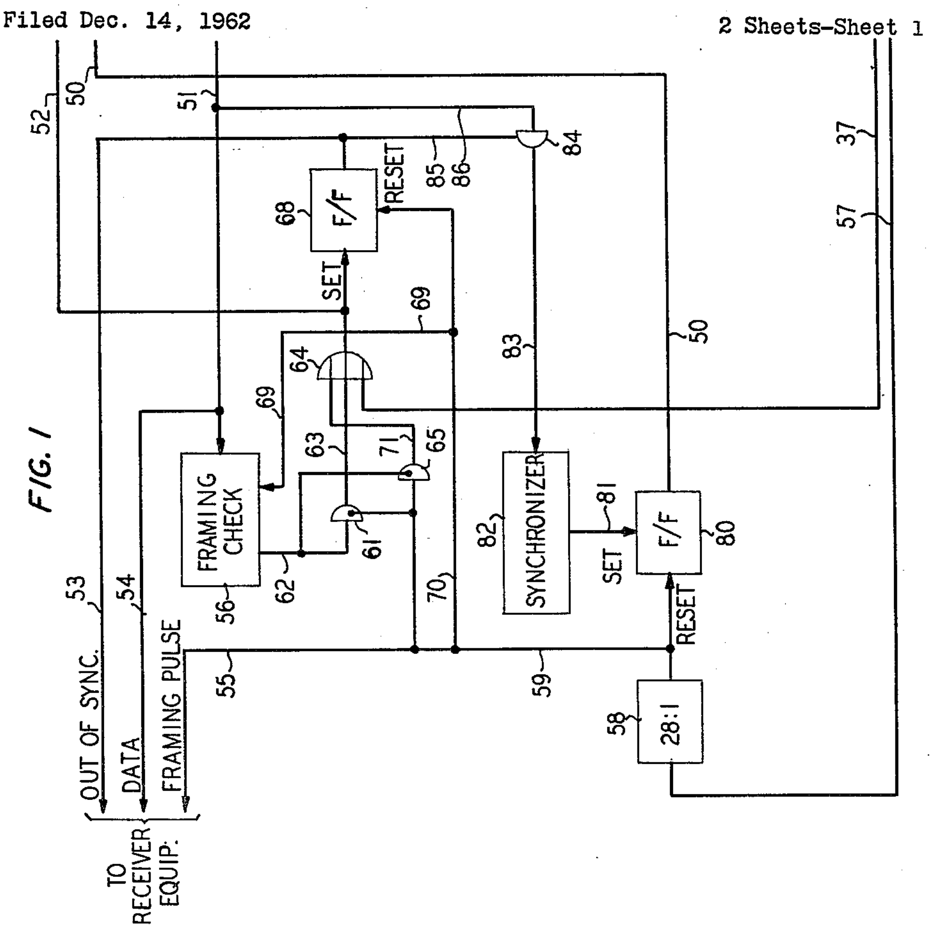

This invention relates to receiver circuits, and more particularly, to input unit-synchronizing circuit combinations for use therein.

Modern technology abounds in pulse communication systems in which a transmitting source sends data over one of many types of communication channels to a receiving site. Receiver equipment at this site operates upon the incoming data. In many applications however the incoming data is not applied directly to the receiver equipment. Often the incoming data is temporarily stored in a registering device, and is subsequently read out of this device and directed to the receiving equipment.

An example will illustrate the necessity of this intermediate storage. The transmitter often sends out data pulses under control of a transmitter clock. At predetermined intervals, perhaps every few milliseconds or microseconds, the transmitter sends out a piece of data. The receiver equipment operates upon each piece of receveid data but does so under the control of a receiver clock. That is, the receiver equipment expects to receive pieces of data at predetermined time intervals. Usually, for the two ends of the system to be compatible with each other the transmitter and receiver clocks have the same frequency. However it is apparent that the two clocks may be out of phase with each other, and the transmiter may send a piece of data when the receiver equipment is not yet ready to accept it. By storing all incoming bits in an intermediate storage device at the receiver site, the bits may be read out and directed to the receiver equipment when required under the control of the receiver clock.

Suppose, for example, the storage device contains 28 stages with the first bit recevied being stored in the first stage, the second in the second stage, etc. After the 28th bit is stored in the 28th stage the 29th bit is stored in the first stage, and the cycle continues in this manner. Approximately at the time when the 28th bit is being stored in the 28th stage the receiver clock controls read-out from the 14th stage. Approximately at the time when the 29th bit is being stored in the first stage the 15th bit is read out from the 15th stage. The read-out circuit is thus seen to lag the read-in circuit by 14 bits. If bits are suddenly read in faster than they are read out the compatibility of the transmitting and receiving equipments is not destroyed. Although bits are read in to the storage device at a faster than usual rate, this increased rate does not affect the read-out circuit which lags behind the read-in circuit. The bits read in are stored temporarily, and are eventually read out by the read-out circuit. If on the other hand, the read-out circuit suddenly operates faster than usual there are now bits for the receiver equipment to operate upon; the read-in circuit has already stored 14 bits which may be read out at a faster than usual rate before the read-out circuit catches up to the read-in circuit. Similar remarks apply to a sudden decrease in either clock frequency. If the two clock frequencies are, on the average, equal, and provided that instantaneous differences between them do not exceed more than 14 bit-times the compatibility of the two end units is maintained. In any particular application the number of stages in the intermediate storage register is determined by the maximum instantaneous variation in the two clock operations. For example, if either clock is found to pull ahead of, or lag behind, the other by a maximum of $x$ bit times, the compatibility of the two end units is maintained if an intermediate storage register having a capacity of $2x$ or more bits is employed at the receiver site. It is advantageous that the read-in and read-out circuits be out of phase with one another by $x$ bits. In this manner variations in either clock frequency in either direction do not result in erroneous operation.

In many applications the transmitter sends a continuous series of data bits to the receiver. The bits comprise successive words, and in order that the data transmitted be intelligible to the receiver equipment, the receiver must be able to identify individual words. For example, if each word comprises 28 bits the receiver may start counting the number of bits received beginning with the first, and after every 28th bit is counted, the receiver is made aware that the next incoming bit is the first in a new word. In this manner the transmitter and receiver circuits are synchronized to each other. Although a continuous stream of bits may be transmitted, the receiver nevertheless subdivides these bits into intelligible groups, or words.

Very often each transmitted word has inserted among its data bits one or more framing bits. These framing bits are in predetermined positions, and their values comprise a predetermined sequence. As long as the proper polarity bit is received in each position that should contain a framing bit, the receiver assumes itself to be in synchronism. If synchronism is lost a synchronizing circuit at the receiver site analyzes successive bits and establishes which bits are the framing bits, i.e., the synchronizing circuit resynchronizes the receiver.

The synchronizer circuit may require a time interval during which one or more words are transmitted before synchronization is regained. The time required depends upon the random nature of the bits transmitted, and this time may vary from operation to operation. After the synchronization process, due to certain requirements often found in the receiver system and described hereinbelow, the read-in and read-out circuits may not be separated by the desired number of stages. Not only may the compatibility of the two end units thus be destroyed, but in addition, the compatibility of the intermediate storage register with the receiver circuit itself may have deteriorated.

It is a general object of this invention to provide an improved input unit for a data receiver.

It is another object of this invention to provide an improved method for making the transmitting and receiving circuits of a data communication system compatible with each other.

It is another object of this invention to provide methods and means for maintaining this compatibility even after a synchronization process at the receiver site.

It is still another object of this invention to provide methods and means for regaining this compatibility even if it is lost because of an unusually large variation in the clock frequency at either the transmitter or receiver site, or for any reason other than as a result of an attempt at resynchronization.

In the illustrative embodiment of the invention the intermediate storage register contains 28 stages with the read-in and read-out circuits being separated in the ideal condition by 14 stages. When a framing check circuit detects a loss of synchronization the read-in circuit continues to advance and store incoming bits in the register. The read-out circuit also continues to advance and directs the bits read out from the register to the synchronizer circuit. The synchronizer circuit determines when the bit last read out is the first bit in a new word.

The receiver equipment may not be ready at this time however to operate upon this first bit in a new word. If a word in the system contains 28 bits, for example, the receiver equipment may include a 28:1 frequency divider, this divider producing an output pulse once for every 28 receiver clock pulses. It is only when this pulse from the frequency divider is obtained that the first bit in a new word should be applied to the receiver equipment. Every 28th receiver clock pulse is thus what may be considered to be a "major" clock pulse. These major clock pulses are required to synchronize to each other the various blocks of equipment included in the receiver circuitry. Thus when the synchronizer circuit happens to determine that the bit last read out by the read-out circuit is the first bit in a new word the receiver equipment may not yet be ready to operate upon this bit. It is only when the next major clock pulse is obtained that the read-out circuit should read out this first bit and the succeeding ones. Consequently, in the illustrative embodiment of the invention, the read-out circuit is inhibited at this time. It remains at the storage position containing the first bit in a new word, and only when the next major clock pulse is received does it read out this first bit and continue to advance.

During the period of read-out circuit inhibition the read-in circuit continues to advance. The read-in circuit is not inhibited for to do so would result in the loss of bits received during the period of inhibition. Without the provision of a compensatory operation, this technique would cause the read-in circuit to catch up to the read-out circuit, and perhaps even overtake it. In the invention however, this is avoided by causing the read-out circuit to jump ahead when a loss of synchronization is first detected. The read-out circuit initially advances to a point slightly behind the read-in circuit when a loss of synchronization is first detected. At the end of the synchronization process when the read-out circuit is inhibited while the read-in circuit continues to advance, the read-in circuit pulls ahead of the read-out circuit. When the next major clock pulse is received the read-in circuit is once again 14 bits ahead of the read-out circuit. At this time the read-out circuit resumes advancing, and it is seen that the two circuits bear the ideal 14 stage relationship to each other.

By initially advancing the read-out circuit the effect of its later inhibition is compensated. It must be determined however how far the read-out circuit must be initially advanced when a loss of synchronization is first detected. The number of stages which the read-out circuit should initially advance is dependent upon the number of bit-times during which it is later inhibited in order that at the end of the synchronization process the read-in and read-out circuits be 14 stages apart. Thus it becomes necessary to determine for how many bit-times the read-out circuit is inhibited at the end of each synchronization process. The number of bit-times of this inhibited operation is equal to the number of receiver clock pulses obtained between the time that it is determined that the last bit read out is the first in a new word, and the time that the next major clock pulse is received. Usually there is no designed relationship between the time that the synchronizer circuit determines which bit is the first in a new word and the time that the next major clock pulse is obtained as the synchronizer circuit may require a different time period for its operation each time it is employed. However, in any given application or system there is an inherent relationship between the time that the synchronizer determines which bit is the first in a new word, and the time that the next major clock pulse is obtained. The number of bit-times between these two may be determined by performing a series of tests. The receiver is purposely thrown out of synchronism, and each time this is done the number of bit-times during which the read-out circuit is inhibited at the end of the synchronization cycle is measured. An average of these bit-times is taken, and this average is an inherent characteristic of the system. Suppose for example, a series of tests is performed and it is determined that, on the average, the read-out circuit is inhibited for four bit-times at the end of each synchronization process. If the read-out circuit is thus initially advanced to a position four stages ahead of its ideal position when the loss of synchronism is first detected, on the average, after it is inhibited for four bit-times at the end of the synchronization process the read-in- and read-out circuits are once again separated by 14 stages when the next major clock pulse is obtained.

This method allows the read-in and read-out circuits to be separated by half the number of stages in the intermediate storage register even after a synchronization process. This technique affords another advantage. It is possible for the read-in and read-out circuits to approach each other too closely for the compatibility of the transmitter and receiver equipments to be maintained. This may arise, for example, due to a sudden and unusual increase or decrease in the frequency of either the transmitter or receiver clock. In such an event the read-in and read-out circuits must be repositioned so that they are 14 stages apart. As described below this may be achieved by instituting an "artificial" synchronization process. By utilizing the same equipment that enables the read-in and read-out circuits to bear the ideal relationship to each other even after the synchronization process, it is possible to correct sudden and unusual variations with the need of only very little additional equipment.

It is a feature of this invention to inhibit the read-out circuit of an intermediate storage register for the time interval between the determination by an associated synchronizer circuit of which stage in the register contains the first bit in a new word, and the time when the next major clock pulse of the receiver system is applied.

It is another feature of this invention to initially advance the read-out circuit when a loss of synchronism is first determined to a point behind the read-out circuit such that after the period of read-out circuit inhibition the read-in and read-out circuits are separated by half the stages in the intermediate storage register.

It is still another feature of this invention to utilize the above means in an "artificial" synchronization process when the read-in and read-out circuits are too close to one another in order that they be separated once again by half the stages in the intermediate stoarge register.

Figure 3:
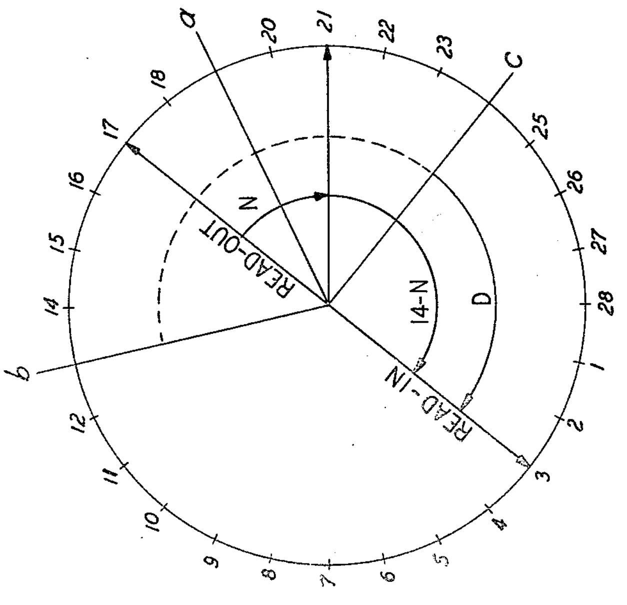
Figure 2:
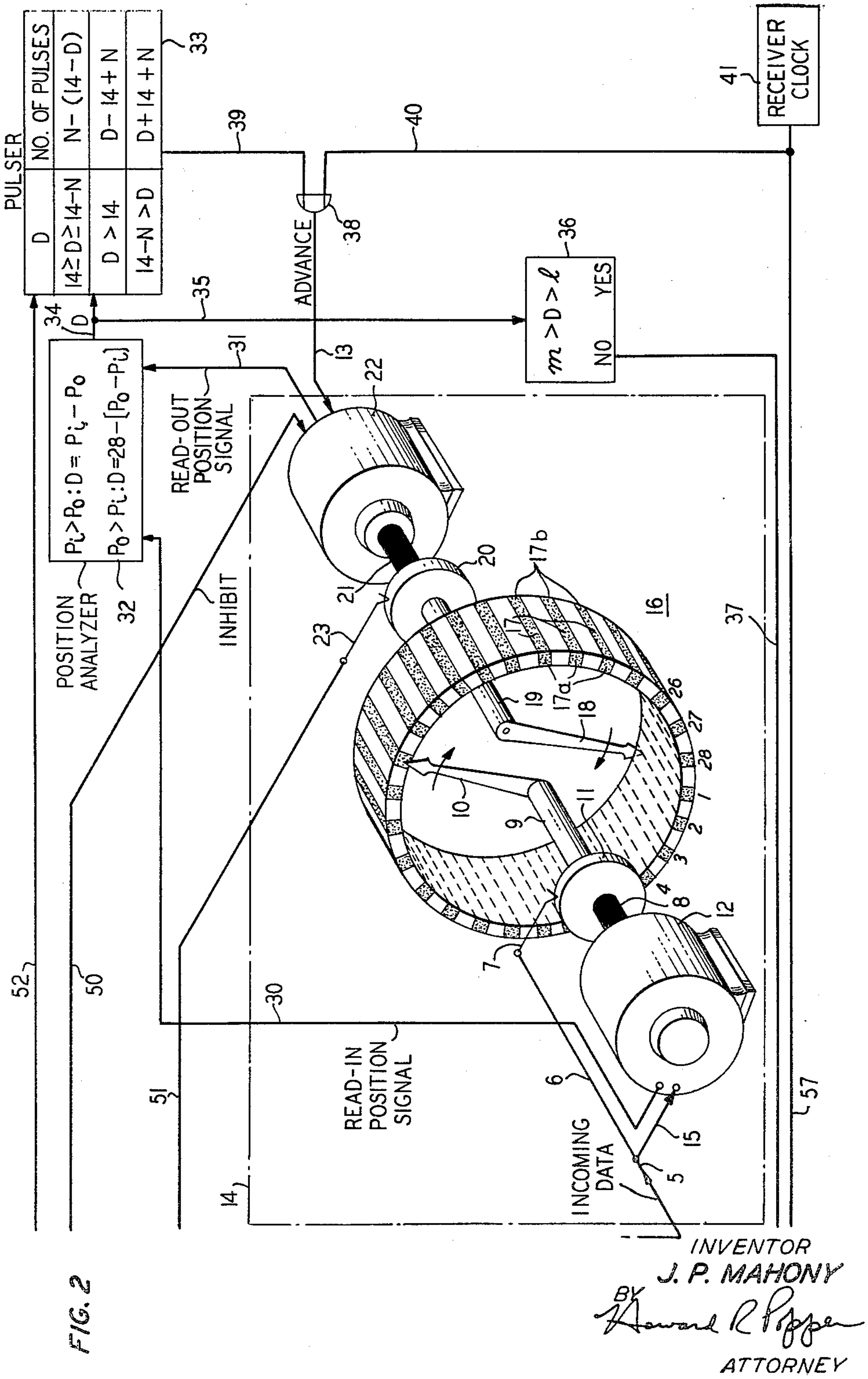

The above and other objects and features of the invention may be more readily understood from the following description taken in conjunction with the drawing in which:

FIGS. 1 and 2 together are a schematic of an illustrative embodiment of the invention; and FIG. 3 is a diagram that will be of aid in the understand of the operation of the circuit shown in FIGS. 1 and 2.

Data originating at a transmitting site (not shown) enters the digital terminal unit of the present invention on conductor 5 in FIG. 2. After being acted upon, the digital data, whose alternate polarity pulses represent binary "0's" and "1's," is forwarded to the associated receiving equipment data conductor 54 in FIG. 1.

The data incoming over conductor 5 enters block 14 where it is registered in register 16. While the elements within block 14 advantageously may include an electronic storage register and two ring counters rather than the particular combination of mechanical input and output elements that have been depicted, the symbolic arrangement which has been shown more clearly illustrates the principles of the present invention in which it is important to visualize the relationship between input hand 10, output hand 18, and register 16. Accordingly, the principles of the invention will be described by actually considering an embodiment in which the storage register 16 is circular not only in operation but in appearance as well.

Each incoming pulse, whether of the polarity representing a binary "0" or of that representing a binary "1," is applied from conductor 5 to conductor 15 connected to the advance input of motor 12. The arrival of either polarity pulse on conductor 15 causes the motor shaft to step clockwise from one storage position 17 of register 16 to the next storage position therein. The data words incoming on conductor 5 each contain twenty-eight bits and, accordingly, register 16 has twenty-eight storage positions 17. Each storage position 17 comprises a one-bit storage device, such as a flip-flop, whose near-end input terminal *17a* may be contacted by input hand 10 and whose far-end output terminal *17b* may be contacted by output hand 18. A pulse on input hand 10 of one polarity sets, and a pulse of opposite polarity on input hand 10 resets, the contacted one of the storage elements of register 16. When the storage element is set, its output terminal *17b* exhibits one polarity and when it is reset, its output terminal *17b* exhibits the opopsite polarity. Accordingly, the signal appearing on output hand 18 depends upon the state of the storage element with whose output terminal *17b* hand 18 makes contact.

At the same time that the incoming pulse appears on conductor 5 it is also applied to conductor 6, brush 7, ring 11, shaft 9, and input hand 10. Shaft 8 is of insulating material, but shaft 9 and input hand 10 as well as ring 11 are of conducting materials and cause the incoming pulse to be applied to whichever storage position in register 16 input arm 10 is made to contact by motor 12. Thus, each incoming bit of data is stored in a respective storage position 17 of register 16. When input arm 10 contacts an input terminal *17a* of a storage position into which it had written a binary bit on a previous rotation of shaft 9, it causes the bit previously stored to be erased and the new bit to be stored.

As mentioned above, the mechanical input and output elements depicted in block 14 may be replaced by all electronic devices. For example, register 16 may be a conventional electronic register comprising a plurality of flip-flop stages. Two access circuits each of which comprises a ring counter may be associated with the register. Every stage in each of the ring counters is connected with a corresponding storage position in register 16. The read-in ring counter is advanced by each incoming bit appearing on conductor 5 to enable a corresponding storage position of reigster 16 to receive the bit. Bits are read out of the register 16 to conductor 51 each time the read-out ring counter is advanced by a pulse applied to conductor 13. An inhibit signal applied to conductor 50 would prevent the read-out ring counter from advancing. Signals representing the relative count of the read-in and read-out counters would be provided on conductors 30 and 31, respectively.

However, because the principles of the present invention are more readily understood by considering an embodiment in which the relative relationship of the read-in and read-out counters can actually be visualized, the ensuing description will be made in terms of the mechanical model depicted.

Motor 22 controls read-out from the register. Each time the advance conductor 13 is pulsed motor 22 causes insulated shaft 21, ring 20, conducting shaft 19, and hand 18 to rotate clockwise (as viewed from the hand 18 end of shaft 19) one position. Hand 18 reads out the binary state of the storage element to which it is adjacent. A particular polarity pulse appears on brush 23 and read-out conductor 51. Normally the advance pusles are applied by receiver clock 41. The clock applies pulses to conductor 40 which pass through OR gate 38 to conductor 13.

Although the receiver clock frequency is, on the average, equal to the frequency of the incoming bits, the receiver and transmitter frequencies may vary at particular instants or over periods of time. Read-in is necessarily controlled by the incoming bits as hand 10 must be advanced only when each bit is received. Read-out is not controlled by the incoming bit rate; it is controlled by a separate receiver clock. There is other equipment associated with the receiver which must be controlled by a local clock, and if this equipment is to function with the receiver and digital terminal unit equipment, it is necessary to control this latter equipment by the local clock as well. Consequently, hand 18 is under the control of receiver clock 41.

It is seen in FIG. 2 that if the incoming bit rate increases, hand 10 rotates more rapidly than hand 18. Hand 10 must not advance ahead of hand 18 or else part of a word stored in the register is erased, by the read-in of a new word, before it is read out. Similarly, if the incoming bit rate decreases it is seen that hand 18 rotates more rapidly and may pull ahead of hand 10. This must be avoided as well, for were hand 18 to catch up to hand 10 and advance beyond it, part of a previously read-out word would be read out again and erroneously treated by the receiver as the succeeding word.

As the transmitter and receiver clocks have approximately equal rates, hands 10 and 18 have normal relative positions as shown in FIG. 2; they are 14 bits out of phase. Even if one hand advances more than the other, because the clock frequencies are on the average equal, the advanced hand will eventually slow down and once again the read-in and read-out circuits will be 14 bits apart. By separating the two hands by 14 bit positions, maximum reliability is attained.

Each incoming word comprises 28 bits. The receiver equipment operates on each word but must be notified when the first bit in each word appears. This is necessary in order that the receiver equipment be in synchronism with the transmitter. The pulses of clock 41 are applied to conductor 57. Frequency divider 58 (FIG. 1) causes a pulse to be applied to conductor 59 after each 28th pulse on conductor 57. This "framing pulse," or "major clock pulse," is applied to conductor 55 which is extended to the receiver equipment. The data read out from register 16 and appearing on conductor 51 is extended along conductor 54 to the receiver equipment. Each time the first bit in a word appears on conductor 54 a framing pulse appears on conductor 55 to notify the receiver equipment that the bit on conductor 54 is the first in a new word.

As in many receivers, a framing check circuit 56, which may be any of well-known types, is provided to insure that the framing pulse on conductor 55 indeed appears when the first bit in a new word appears on conductor 54. Each incoming word is provided with framing information. For example, only 27 bits in each word may be data information while one bit in each word, for example the first, is a framing bit. This bit may, for example, always be a binary 1. The framing check circuit 56 counts 28 bits on conductor 51 and if the next bit, the framing bit, is of the correct polarity, a pulse is applied on conductor 62. This pulse should appear at the same time that the framing pulse appears on conductor 59. Gates 61 and 65 are of the type which are enabled only if their control terminals are not energized. If pulses appear simultaneously on both of conductors 62 and 59, neither of gates 61 and 65 is enabled, neither of conductors 63 and 71 is energized, and OR gate 64 is not operated. However, if one pulse appears on either of conductors 59 or 62 without the other, one of gates 61 and 65 is enabled and OR gate 64 is operated. The operation of this gate causes flip-flop 68 to be set indicating that the receiver equipment is out of synchronism. When flip-flop 68 is set, an out of synchronism signal appears on conductor 53 which is extended to the receiver equipment. This signal notifies the receiver equipment that although data bits still appear on conductor 54, the receiver equipment should not operate on these bits as it does on all others because it is not known which 28 successive bits comprise a complete word. When flip-flop 68 is set it is necessary to resynchronize the receiver equipment. The signal on conductor 85 enables gate 84, and the bits now read out from storage register 16 are applied along conductor 86 and through gate 84 to conductor 83. The bits enter synchronizer 82. The synchronizer may also be any of many types, e.g., that disclosed in my copending application, Serial No. 243,203 filed December 5, 1962. Synchronizer 82 determines when the last bit read out is the first in a new word. At this time the synchronizer applies a signal to conductor 81 to set flip-flop 80 which in turn applies a signal to conductor 50 indicating that the last bit read out is the first of a new word. The read-out arm no longer advances because the signal on conductor 50 inhibits motor 22 even though advance pulses may continue to be applied to conductor 13. The first bit of a new word should appear on conductor 54 only when the framing pulse appears on conductor 55. The appearance of the framing pulse is determined by clock 41 and frequency divider 58. When the next framing pulse is supplied, the read-out equipment reads out the same framing bit, and starts to advance in order to read out the successive bits of the word. Hand 18 does not advance from the position containing the first bit in the word until the framing pulse appears at the output of frequency divider 58. At this time flip-flop 80 is reset and the inhibit signal is removed from conductor 50. Hand 18 then advances with the next application of an advance pulse on conductor 13. In this manner the first bit in a new word appears on conductors 51 and 54 when the framing pulse appears on conductor 55. The read-out equipment then resumes advancing and successive bits appear on conductor 54.

The framing pulse on conductor 70 also resets flip-flop 68. The out of synchronism signal on conductor 53 is removed. Similarly, gate 84 is no longer enabled, and the bits read out from register 16 are no longer applied to synchronizer 82. In addition, the framing pulse on conductor 69 notifies framing check circuit 56 that the bit just read out is the first in a new word. Twenty-eight bits later framing check circuit 56 applies a signal on conductor 62, and as the circuit is now in synchronism a framing pulse on conductor 59 should appear at the same time.

The inhibited operation insures that the first bit in a new word appears on conductor 54 when the framing pulse appears on conductor 55 even though synchronizer 82 determines synchronism before the next framing pulse on conductor 55 is obtained. It is seen however that the read-out circuit has been inhibited for as long as the inhibit signal appears on conductor 50. The inhibit signal is applied between the time that synchronizer 82 sets flip-flop 80, and the time that the framing pulse resets this flip-flop. As hand 18 has not advanced during this time, were means not provided to compensate for this period of inhibited operation, the read-in hand 10 would advance closer to hand 18, and the two hands would no longer be out of phase by half a word. As the transmitter and receiver clocks vary slightly, for maximum reliability it is necessary that the two hands be separated by 14 bits in order that the circuit not malfunction for instantaneous variations in either clock frequency. Thus it is necessary to insure that even after a synchronization cycle the read-in and read-out circuits still be 14 bits apart.

The circuit may be best understood with reference to FIG. 3. In this figure the read-out hand is shown at position 17 with the read-in hand at position 3, the two hands being separated by the ideal number of positions, 14. Suppose at this time the out of synchronism signal appears on conductor 53. It is seen that were both hands to advance as normal during the synchronization process, and after the synchronization process the read-out hand were to be inhibited for the time interval between the setting and resetting of flip-flop 80, the read-in arm would continue to advance clockwise and approach the read-out arm. The two would no longer be 180 degrees out of phase. To compensate for the period of read-out inhibition, the read-out hand is initially advanced to a position 14—*N* positions behind the read-in hand when OR gate 64 is first operated. For example, if the circuit is detected to be out of synchronism when the read-in and read-out hands are in the positions shown in FIG. 3, the read-out arm immediately advances from position 17 to position 21, where N is in this case equal to four. Although the read-in and read-out hands both continue ot advance during the synchronization process, the read-in hand is on the average only 10 bits ahead of the read-out hand, rather than 14. At the end of the synchronization process however, if the read-out hand is inhibited for four bit-times while the read-in hand continues to advance, it is seen that the two hands are once again 14 bits out of phase when flip-flop 80 is reset.

In order for this method to allow the two hands to be separated by 14 bits even after the synchronization process, it is necessary to determine how many bits the read-out hand must be initially advanced at the beginning of the synchronization cycle. This number of bits is dependent upon the number of bit-times during which flip-flop 80 is set. In a particular application a series of tests may be performed wherein the receiver is intentionally caused to fall out of synchronism. Synchronizer 82 is then made to operate, and the number of bit-times between the setting of flip-flop 80 and its resetting is measured for each test. An average of these times is taken and determines the value of N. Since the read-out arm is initially advanced to a position 14—*N* positions behind the read-in arm when the receiver circuit first falls out of synchronism, and it is later inhibited for N bit-times, it is seen that after the synchronization cycle the read-in and read-out circuits are once again 180 degrees out fo phase.

Position analyzer 32 and pulser 33 control the initial advance of the read-out hand by N bit positions when a loss of synchronism is first detected. N is the number of bit-times during which the read-out circuit is inhibited during each synchronization process, and is determined by taking a statistical average in each particular system in which the digital terminal unit of the invention is employed. Referring to FIG. 3 if the read-out and read-in arms are separated by 14 bit positions motor 22 must be pulsed N times in succession at the beginning of the synchronization process in order for the two hands to be 180 degrees out of phase when synchronism is regained. However, it is possible that when the loss of synchronism is first detected the read-in and read-out hands are not 180 degrees out of phase to begin with. It must be borne in mind that the read-in and read-out hands are 180 degrees out of phase only if the receiver and transmitter clocks have the same rate. Over periods of time it is possible that the read-in and read-out arms may vary from the ideal relationship. Consequently, were the read-out hand advanced by N positions, the ideal read-in and read-out hand relationship would not be insured. The desired initial relationship is to have the read-out hand lag the read-in hand by 14—*N* bit positions, as the read-out hand after the inhibition period will then lag the read-in hand by 14 positions. Referring to FIG. 3, it is seen that the position of the read-out circuit with respect to the read-in circuit may be any one of three types. Type *a* is where the read-out arm lags the read-in arm by less than 14 positions but by more than 14—*N*. In position *a* shown in FIG. 3, where N is assumed in a particular application to be equal to 4, the read-out arm must be advanced by two positions rather than four when loss of synchronism is first detected.

Position type *b* is where the read-out arm lags the read-in arm by more than 14 positions. And finally position type *c* is where the read-out arm lags the read-in arm by less than $14-N$ positions.

D represents the instantaneous number of bit positions by which the read-in circuit leads the read-out circuit. Position analyzer 32 determines the value of D. The two inputs to the position analyzer are derived from the two motors and appear on conductors 30 and 31. The signals on these conductors represent the numerical positions of the respective hands. Position analyzer 32 applies a signal, D, on conductor 34 that represents the number of bit positions by which the read-in circuit leads the read-out circuit. Two possibilities exist. If the numerical position of the read-in circuit, $P_i$, is greater in value than the position of the read-out circuit, $P_o$, the value of D is merely the difference. Thus, for example, if the read-in position is at position 27 and the read-out circuit is at circuit 14, the value of D is 27−14 or 13. On the other hand, if $P_o$ is greater than $P_i$, for example $P_o$ is 17, and $P_i$ is 3 as shown in FIG. 3, D is equal to 28 minus the difference of the two readings. Referring to FIG. 3, with the hands as shown the numerical difference of the position readings, $P_o-P_i$, is 17−3 or 14, and D is equal to 28−14 or 14. A clearer example can be had by assuming that the read-in hand is at position 3 as shown in FIG. 3, but the read-out hand is in position *a*, position 19. In such a case $P_o-P_i$ is 19−3 or 16. D is equal to 28−16 or 12 which is indeed seen to be the case from FIG. 3. The value of D supplied to the input of pulser 33 is thus the number of bits by which the read-in circuit leads the read-out circuit, and is independent of the numerical positions of the two circuits.

When OR gate 64 first operates indicating a loss of synchronism the pulse on conductor 52 triggers pulser 33. The pulser at this time, depending upon the value of D applied to its input, pulses conductor 39 a number of times such that the read-in circuit lags the read-out circuit by $14-N$ positions. Each pulse on conductor 39 is transmitted through OR gate 38 to conductor 13. These pulses are applied quickly in succession and the read-out hand is immediately advanced to a number of positions behind the read-in hand that is equal to $14-N$. Pulser 33 applies a number of pulses to conductor 39 that depends upon the value of D. Three ranges for the value of D exist, each of positions *a*, *b*, and *c* shown in FIG. 3 being in a different one of these ranges. The first of these is position *a* where $14 \geq D \geq 14-N$. Motor 22 must be pulsed fewer than N times in order for the read-out hand to lag the read-in hand by only $14-N$ bits. In fact it must be pulsed an amount less than N by $14-D$, $14-D$ being the amount that the read-out arm is ahead of the position where it should be were it the ideal 14 bits behind the read-in hand. Consequently pulser 33 applies $N-(14-D)$ pulses to conductor 39 to advance the read-out circuit to a point $14-N$ positions behind the read-in circuit.

When the read-out circuit is in position *b*, for example, as a result of a momentary increase of the read-in pulse rate, it is seen that $D>14$, D being equal to 28−(13−3) or 18. In such a case the read-out circuit must be pulsed not only N times, but in addition, the number of positions by which the read-out circuit is behind the ideal position. From FIG. 3 it is seen that the read-out circuit must be pulsed $D-14$ times for it to be 14 positions behind the read-in circuit. When pulsed another N times the read-out circuit is $14-N$ positions behind the read-in position. Thus when $D>14$ the number of pulses applied to conductor 39 is $D-14+N$.

The third type of position, position *c*, is where $14-N$ is greater than D. The read-out circuit is so far ahead of where it should be that the only way to get the read-out circuit $14-N$ positions behind the read-in circuit is to cause the read-out circuit to advance beyond the read-in circuit, and all the way around till it is $14-N$ positions behind the read-in circuit. Referring to FIG. 3, with the read-out circuit at position 24 and where $14-N$ positions behind the read-in circuit is position 21, the read-out arm at position 24 must be pulsed D times until it is at the same position as the read-in circuit, an additional 14 times until it is where it ideally should have been before the loss of synchronism was detected, and an additional N times to make the read-out circuit lag the read-in circuit by $14-N$ positions. Consequently with the third situation where $14-N$ is greater than D, conductor 39 is pulsed $D+14+N$ times.

In this manner, with the signal D being continuously applied to the pulser input, when OR gate 64 is first operated and the signal on conductor 52 triggers the pulser, the read-out circuit is automatically advanced to the point where it lags the read-in circuit by $14-N$ positions. At the same time synchronizer 82 begins to operate on the bits read out and appearing on conductor 83. When synchronizer 82 determines that the read-out hand is adjacent the storage element containing the first bit in a new word conductor 81 is pulsed and flip-flop 80 is set. The output signal on conductor 50 inhibits further operation of the read-out circuit by the receiver clock advance pulses on conductor 13. The read-in circuit continues to advance however, the read-in circuit being controlled by incoming data rather than the receiver clock. When the next framing pulse appears at the output of frequency divider 58, flip-flop 80 is reset and motor 22 is no longer inhibited. As the pulse from the receiver clock was applied to motor 22 at the same time it was applied to the input of frequency divider 58, the framing pulse resets flip-flop 80 after the pulse on the advance conductor 13 has terminated. The clock pulse, from which the framing pulse originates, thus does not cause motor 22 to advance. This is desired as the read-out circuit is now at the position containing the first bit of the word, as it has been during the entire period that flip-flop 80 was set. This first bit appears on conductors 51 and 54, and is extended to the receiver equipment along with the framing pulse on conductor 55. The next receiver clock pulse causes motor 22 to advance and read out the second bit in the word. As the circuit is now in synchronism, conductors 59 and 62 will hereafter be energized together and further use of synchronizer 82 is not required. The first framing pulse on conductor 70 resets flip-flop 68 thus disenabling gate 84 and removing the out of synchronism signal extended to the receiver equipment over conductor 53. In addition, this first framing pulse on conductor 69 notifies framing check circuit 56 that the bit having just appeared on conductor 51 was the first bit in a new word, and framing check circuit 56 is thus synchronized to the incoming word along with the receiver equipment.

In this manner, during each synchronization cycle because the read-out circuit is initially advanced to a point behind the read-in circuit that is equal to a half word length minus the statistical average of read-out circuit inhibition, after the N-bit period of inhibiton, the two circuits are, on the average, 180 degrees out of phase as desired.

In the illustrative embodiment of the invention the same circuitry that is utilized in the synchronization process may be advantageously used when synchronism is not lost, but when the read-out and read-in circuits are too close to one another. The signal on conductor 34, representing the number of positions by which the read-in circuit leads, is continuously applied to comparator 36. This circuit checks whether or not D lies between two arbitrarily selected values *l* and *m*. For example *l* may be three and *m* may be 25. If D has any one of the values 4 through 24 the read-in and read-out circuits are not too close to one another to require a readjustment of their relative positions. However, if D is 3 or less, or 25 or more, a signal is applied by comparator 36 to conductor 37. This conductor is the third input of OR gate 64 which is triggered at this time.

Position analyzer 32 and pulser 33, as usual, control the advance of the read-out circuit to 14—*N* positions behind the read-in circuit. It is true that the circuit is not necessarily out of synchronism but an artificial synchronization process nevertheless ensues. As usual the read-out circuit is inhibited from the time that flip-flop 89 is set until it is reset. After the flip-flop is reset the read-in and read-out circuits are once again, on the average, 180 degrees out of phase.

During this artificial synchronization process an out of synchronism signal appears on conductor 53. If it is desired that the receiver equipment not treat incoming data during the artificial synchronization sequence as it does incoming data during a true synchronization process, an additional conductor connected to conductor 37 may be extended to the receiver equipment. A signal on this conductor may notify the receiver equipment that the synchronization process in progress is artificial only, and was initiated only for the purpose of readjusting the relative positions of the read-in and read-out circuits.

Various elements in the drawing are shown in block diagram form only in order not to needlessly complicate the disclosure. Numerous circuits exist in the art that may be incorporated in the system shown. For example, position analyzer 32 may comprise any one of many analog devices whose output represents the difference of two input positions. Numerous electronic circuits exist for providing a number of pulses dependent upon the value of the input signal, and these may be utilized for the block shown in the drawing only as pulser 33. In addition, although storage register 16 is symbolic only, and although the read-in and read-out circuits include mechanical elements and motors, numerous electronic registers may be advantageously utilized in the circuit. The particular read-in and read-out circuits disclosed have been chosen to more clearly illustrate the principles of the invention.

In the illustrative embodiment of the invention each word has a length of 28 bits, and storage register 16 has 28 stages. It should be understood that the storage register may contain a number of bits fewer than those in a word, or a number of stages capable of storing more than one word. The number of stages required in the particular application is determined by the normal variations in the read-in and read-out positions. It is found that in a particular application either circuit may pull ahead of the other by 30 bit-times, a storage register having 60 or more stages is preferable.

Similarly, although in the illustrative embodiment the ideal relationship of the hand positions is one in which each is ahead of the other by the same amount, in other applications it may be preferable for one of the hands to be slightly advanced. If it is found that the receiver clock is more prone to increase its rate than the transmitter clock it may be desirable for the read-in circuit to lag the read-out circuit by less than the read-out circuit lags the read-in circuit. The invention is still applicable with such a system, pulser 33 being adjusted accordingly.

Similarly, in a particular application each word may be divided into two or more subframes. In such an event there may be a major clock pulse for each subframe. If the receiver equipment may accept data beginning at any subframe of the word the synchronizer circuit need merely indicate which stage contains the first bit in a subframe, and which particular subframe in the word it is. The period of inhibition may thus be decreased as the read-out circuit need not be inhibited until a major clock pulse associated with the beginning of a new word is obtained but rather only until a subframe clock pulse is obtained. In such a system the value of N is reduced accordingly.

Although the invention has been described with reference to a specific embodiment, it is to be understood that this embodiment is illustrative of the application of the principles of the invention, and that various modifications may be made therein without departing from the spirit and scope of the invention.

What is claimed is:

1. A terminal unit for a data pulse receiver comprising storage means having a number of stages equal to the number of bits in an incoming word, read-in means for continuously storing incoming bits in said storage means, read-out means for reading out said bits from said storage means and normally operating approximately a half word length behind said read-in means, means for advancing said read-out means when said receiver falls out of synchronism, a synchronizing circuit for identifying the position in said storage means containing the first bit of a word, means for inhibiting said read-out means after said synchronizing circuit identifies said position until said receiver is prepared to operate upon a new word, and means for controlling said advancing means to advance said read-out means to a predetermined position behind the position of said read-in means that is equal to the difference of a half word length and the statistical average of the number of bit-times during which said read-out means is inhibited.

2. A terminal unit for a data pulse receiver comprising storage means, read-in means for continuously storing incoming bits in said storage means, read-out means for reading out said bits from said storage means and normally operating approximately a predetermined number of bits behind said read-in means, means for advancing said read-out means when said receiver falls out of synchronism, a synchronizing circuit for identifying the position in said storage means containing the first bit of a word, means for inhibiting said read-out means after said synchronizing circuit indentifies said position and until said receiver is prepared to operate upon a new word, and means for controlling said advancing means to advance said read-out means to a position behind the position of said read-in means that is equal to the difference of said predetermined number of bits and the statistical average of the number of bit-times during which said read-out means is inhibited.

3. A terminal unit for a data pulse receiver comprising storage means, read-in means for continuously storing incoming bits in said storage means, read-out means for reading out said bits from said storage means and normally operating a predetermined number of bits behind said read-in means, means for advancing said read-out means when said receiver falls out of synchronism, a synchronizing circuit for identifying the position in said storage means containing a predetermined bit in a word, means for inhibiting said read-out means after said synchronizing circuit identifies said position until said receiver is prepared to operate upon said predetermined bit stored in said position, and means for controlling said advancing means to advance said read-out means to a position behind the position of said said read-in means that is equal to the difference of said predetermined number of bits and the statistical average of the number of bit-times during which said read-out means is inhibited.

4. A terminal unit in accordance with claim 3 further including means for controlling said read-in means to operate at a rate determined by the frequency of said incoming bits, receiver clock means, and means for controlling the operation of said read-out means at a rate determined by the frequency of said receiver clock means.

5. A terminal unit in accordance with claim 3 further including means for detecting when said read-out means is operating more than a first pre-selected number of bits behind said read-in means or less than a second pre-selected number of bits behind said read-in means; and means responsive to said detecting means for operating said advancing means, said synchronizing circuit, said inhibiting means, and said control means as if said receiver had fallen out of synchronism.

6. A receiver circuit comprising storage means, read-in means for storing incoming bits in said storage means, read-out means for reading out said bits from said storage means and normally operating within a pre-selected range of bits behind said read-in means, means for advancing said read-out means when it is desired to reposition said read-in and read-out means, means for identifying the position in said storage means containing a predetermined bit, means for inhibiting said read-out means after said identifying means identifies said position until said receiver is prepared to operate upon said predetermined bit, and means for controlling said advancing means to advance said read-out means to a position behind the position of said read-in means that is equal to the difference of the average number of bits in said range and the average number of bit-times during which said read-out means is inhibited.

7. A receiver circuit comprising storage means, read-in means for storing incoming bits in said storage means, read-out means for reading out said bits from said storage means and normally operating within a pre-selected range of bits away from said read-in means, means for advancing said read-out means when it is desired to reposition said read-in and read-out means, means for identifying the position in said storage means containing a predetermined bit, means for inhibiting said read-out means after said identifying means identifies said position until said receiver is prepared to operate upon said predetermined bit, and means for controlling said advancing means to advance said read-out means to a position away from the position of said read-in means that is equal to the difference of the average number of bits in said range and the average number of bit-times during which said read-out means is inhibited.

8. A data circuit comprising data bit storage means, first means for performing a first operation upon said storage means, second means for performing a second operation upon said storage means and normally operating within a pre-selected range of storage stages away from said first means, means for advancing said first means when it is desired to reposition said first and said second means, means for identifying the stage in said storage means containing a predetermined bit, means for inhibiting said first means after said identifying means identifies said stage until said data circuit is prepared to operate upon said predetermined bit, and means for controlling said advancing means to advance said first means to a position away from the position of said second means that is equal to the difference of the average number of stages in said range and the average number of bit-times during which said first means is inhibited.

9. A data circuit comprising data bit storage means, first means for performing a first operation upon said storage means, second means for performing a second operation upon said storage means and normally operating within a pre-selected range of stages away from said first means, means for advancing said first means when it is desired to reposition said first and second means, means for inhibiting said first means for a number of bit-times shortly after the operation of said advancing means, said number varying from operation to operation of said inhibiting means, and means for controlling said advancing means to advance said first means to a position away from the position of said second means that is equal to the difference of the average number of stages in said range and the average number of bit-times for which said first means is inhibited during each operation of said inhibiting means.

10. A receiver circuit comprising storage means, read-in means for storing incoming bits in said storage means, read-out means for reading out said bits from said storage means and normally operating within a pre-selected range of bits away from said read-in means, means for identifying the position in said storage means containing a predetermined bit when it is desired to adjust the relative positions of said read-in and read-out means, means for inhibiting said read-out means after said identifying means identifies said position until said receiver is prepared to operate upon said predetermined bit, and means for repositioning said read-out means when it is first determined to adjust the relative positions of said read-in and read-out means to compensate for the subsequent inhibition of said read-out means so that after said subsequent inhibition of said read-out means said read-in and read-out means operate within said pre-selected range of bits away from each other.

11. A data circuit comprising data bit storage means, first means for performing a first operation upon said storage means, second means for performing a second operation upon said storage means and normally operating within a preselected range of stages away from said first means, means for identifying the stage in said storage means containing a predetermined bit when it is desired to adjust the relative positions of said first and second means, means for inhibiting the operation of said first means after said identifying means identifies said stage, and means for repositioning said first means when it is first determined to adjust the relative positions of said first and second means to compensate for the subsequent inhibition of said first means so that after said subsequent inhibition of said first means said first and second means operate upon said storage means within said pre-selected range of stages away from each other.

12. A data circuit comprising data bit storage means, first means for performing a first operation upon said storage means, second means for performing a second operation upon said storage means and normally operating within a preselected range of stages away from said first means, means for inhibiting said first means for a time interval determined by said data circuit, and means for repositioning said first means prior to the operation of said inhibiting means to compensate for the subsequent inhibition of said first means so that after said subsequent inhibition said first and second means operate on said storage means within said pre-selected range of stages away from each other.

References Cited by the Examiner

UNITED STATES PATENTS

| | | | |
|---|---|---|---|
| 2,917,578 | 12/49 | Curtis et al. | 178—17 |
| 2,961,535 | 11/60 | Lanning | 328—55 |
| 3,127,475 | 3/64 | Coulter | 179—15 |

DAVID G. REDINBAUGH, *Primary Examiner*